UNITED STATES PATENT OFFICE.

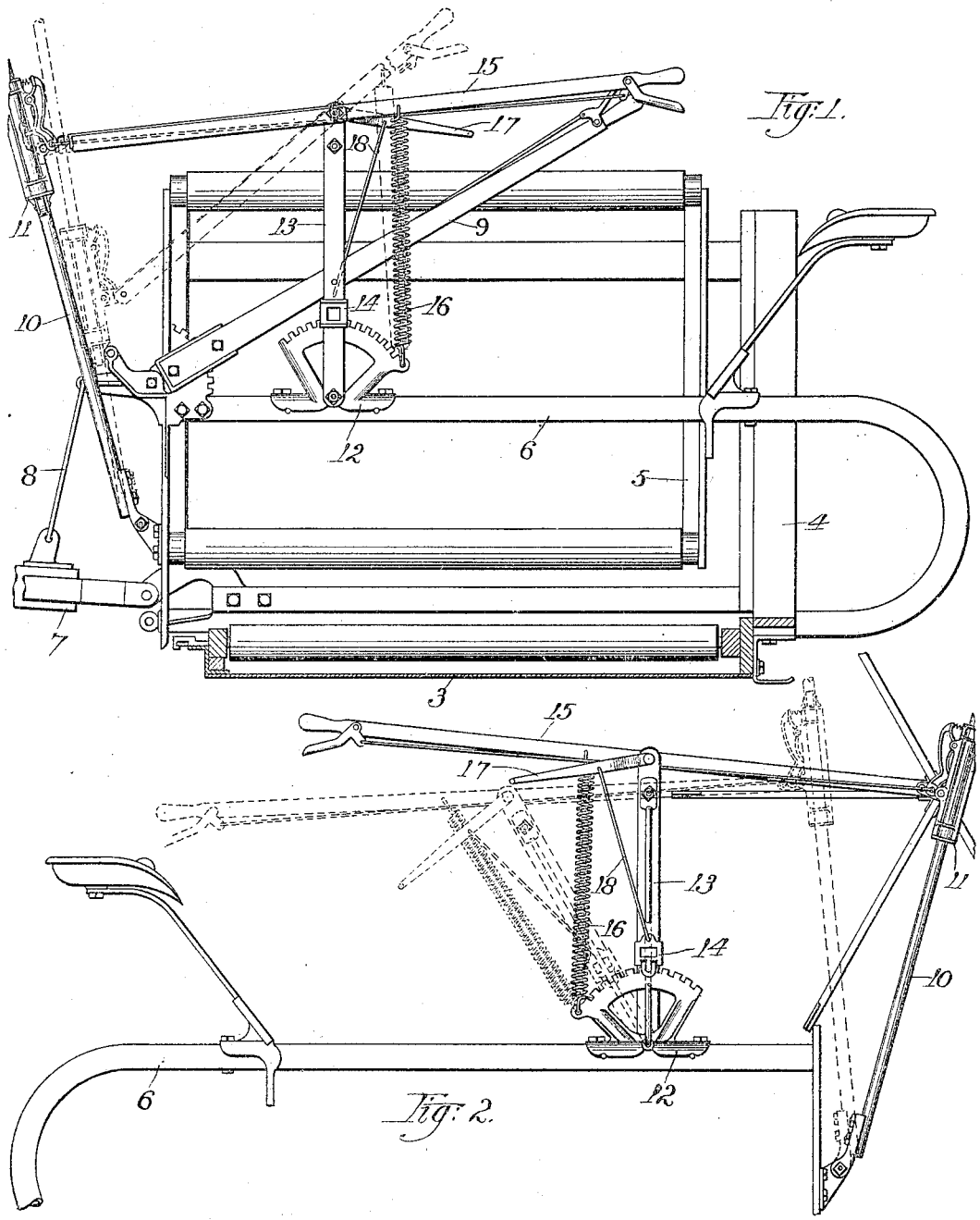

CHARLES A. ANDERSON RAND, OF CHICAGO, ILLINOIS, ASSIGNOR TO INTERNATIONAL HARVESTER COMPANY, A CORPORATION OF NEW JERSEY.

ADJUSTING MECHANISM FOR HARVESTER-REELS.

No. 803,248.        Specification of Letters Patent.        Patented Oct. 31, 1905.

Application filed April 6, 1905. Serial No. 254,074.

*To all whom it may concern:*

Be it known that I, CHARLES A. ANDERSON RAND, a citizen of the United States, residing at Chicago, in the county of Cook and State of Illinois, have invented certain new and useful Improvements in Adjusting Mechanism for Harvester-Reels, of which the following is a specification, reference being had to the accompanying drawings, forming a part thereof.

My invention relates to adjusting mechanism for harvester-reels, the object being to simplify the construction, reduce the cost, and render such mechanism more convenient for manipulation at the hands of the operator.

It consists in such improved devices as are shown in the drawings and described by the specification accompanying this application.

In the drawings, Figure 1 represents so much of a harvester and reel attachment sufficient to illustrate my invention, and Fig. 2 is a view of detached parts of the same.

Like reference-numerals represent like parts.

3 represents the stubbleward end of the grain-platform; 4, the lower elevator carrier-frame; 5, the upper elevator carrier-frame; 6, the seat-supporting pipe; 7, the pole; 8, a connecting-link from the pole to the tilting lever 9, mounted upon the seat-pipe; 10, the reel-supporting standard pivotally connected at its lower end with the frame of the harvester and adapted to swing in a fore-and-aft direction.

11 is a reel-supporting sleeve adapted to slide upon the standard 10 and carries the usual reel-shaft. (Not shown.)

12 is a sector-rack secured to the seat-pipe; 13, a swinging standard pivotally connected with the sector-rack and having a sliding detent 14 adapted to engage with the rack.

15 is a hand-lever pivotally connected with the upper end of the standard 13, its forward end being pivotally connected with the reel-supporting sleeve 11 and its opposite end provided with the usual hand-piece and the thumb-lever for operating the holding means connected with the reel-supporting sleeve, and 16 is a counterbalancing-spring operating between the lever 15 in rear of its pivot and the rear portion of the sector-rack 12.

To provide means for adjusting the reel in a fore-and-aft direction, the standard 13 is adapted to swing upon its pivot, and the short hand-lever 17 is coaxially pivoted at one end with the hand-lever 15 at its upper end. The detent 14 is caused to move toward the sector-rack by the usual spring connections and is disengaged therefrom by an upward movement of the lever 17 through the link connection 18. Connecting the short lever 17 directly with the detent by means of the link 18 and pivoting it upon the swinging standard renders it at all times easily accessible to the operator.

What I claim, and desire to secure by Letters Patent, is—

1. An adjusting mechanism for harvester-reels comprising a standard pivotally connected with a fixed part of the harvester, a sector-rack arranged concentric with said pivotal connection, a detent carried by the standard and adapted to engage with said sector-rack, a hand-lever mounted to rock upon the upper end of said standard and means connected therewith to adjust the reel to a higher or lower plane, a hand-lever also mounted upon the upper end of said standard coaxially with said first-mentioned lever and adapted to adjust the reel in a fore-and-aft direction and a link directly connecting said last-mentioned lever with said detent whereby it may be disengaged from said sector-rack.

2. In a reel-adjusting mechanism for harvesters, the combination of a reel-supporting standard having pivotal connection with a lower front fixed part of the harvester, a sleeve slidably mounted upon said standard, the reel-shaft supported by said sleeve, a second standard pivotally connected with a fixed part of the harvester in rear of said reel-supporting standard and adapted to be swung upon its pivot in a fore-and-aft direction, a hand-lever pivotally mounted at the upper end of said second standard having its forward end connected with said reel-supporting sleeve and adapted when operated to move said sleeve upon the reel-supporting standard, a hand-lever also pivoted at the upper end of said second standard coaxially with said first-mentioned lever and adapted when operated to move said standard about its pivot, a sector-rack secured to a fixed part of the machine and concentric with the pivot of the standard, a detent carried by the standard and adapted to engage with the sector-rack and a link connecting said detent directly with the lever adapted to swing the standard upon its pivot.

In witness whereof I hereto affix my signature in presence of two witnesses.

CHARLES A. ANDERSON RAND.

Witnesses:
E. W. BURGESS,
J. C. WARNES.